(12) United States Patent
Jin et al.

(10) Patent No.: US 11,514,925 B2
(45) Date of Patent: Nov. 29, 2022

(54) USING A PREDICTIVE MODEL TO AUTOMATICALLY ENHANCE AUDIO HAVING VARIOUS AUDIO QUALITY ISSUES

(71) Applicants: Adobe Inc., San Jose, CA (US); THE TRUSTEES OF PRINCETON UNIVERSITY, Princeton, NJ (US)

(72) Inventors: Zeyu Jin, San Jose, CA (US); Jiaqi Su, San Jose, CA (US); Adam Finkelstein, Princeton, NJ (US)

(73) Assignees: ADOBE INC., San Jose, CA (US); THE TRUSTEES OF PRINCETON UNIVERSITY, Princeton, NJ (US)

( * ) Notice: Subject to any disclaimer, the term of this patent is extended or adjusted under 35 U.S.C. 154(b) by 246 days.

(21) Appl. No.: 16/863,591

(22) Filed: Apr. 30, 2020

(65) Prior Publication Data
US 2021/0343305 A1  Nov. 4, 2021

(51) Int. Cl.
*G10L 21/0364* (2013.01)
*G10L 25/30* (2013.01)
(Continued)

(52) U.S. Cl.
CPC ........ *G10L 21/0364* (2013.01); *G06N 3/0454* (2013.01); *G06N 3/084* (2013.01); *G10L 25/18* (2013.01); *G10L 25/30* (2013.01)

(58) Field of Classification Search
CPC ..... G10L 21/0364; G10L 25/18; G10L 25/30; G10L 21/0208; G10L 2021/02082;
(Continued)

(56) References Cited

U.S. PATENT DOCUMENTS

2019/0130903 A1* 5/2019 Sriram .................... G10L 15/20

FOREIGN PATENT DOCUMENTS

CN 109326302 A * 2/2019

OTHER PUBLICATIONS

Zhang et al, Monaural Speech Enhancement Using Deep Multi-Branch Residual Network with 1-D Causal Dilated Convolutions, https://arxiv.org/abs/1912.12023, Dec. 27, 2019, pp. 1-11 (Year: 2019).*

(Continued)

*Primary Examiner* — Linda Wong
(74) *Attorney, Agent, or Firm* — Kilpatrick Townsend & Stockton LLP

(57) ABSTRACT

Operations of a method include receiving a request to enhance a new source audio. Responsive to the request, the new source audio is input into a prediction model that was previously trained. Training the prediction model includes providing a generative adversarial network including the prediction model and a discriminator. Training data is obtained including tuples of source audios and target audios, each tuple including a source audio and a corresponding target audio. During training, the prediction model generates predicted audios based on the source audios. Training further includes applying a loss function to the predicted audios and the target audios, where the loss function incorporates a combination of a spectrogram loss and an adversarial loss. The prediction model is updated to optimize that loss function. After training, based on the new source audio, the prediction model generates a new predicted audio as an enhanced version of the new source audio.

20 Claims, 7 Drawing Sheets

(51) Int. Cl.
   G10L 25/18   (2013.01)
   G06N 3/08    (2006.01)
   G06N 3/04    (2006.01)
(58) Field of Classification Search
   CPC ..... G10L 21/02; G10L 15/063; G10L 15/144;
         G10L 15/16; G06N 3/0454; G06N 3/084;
         G06N 3/088; G06N 20/00; G06N 3/02;
         G06N 3/08; G06N 5/04; G06N 3/04;
         G06F 16/75; G06F 16/65; G06F 3/165
   See application file for complete search history.

(56) References Cited

OTHER PUBLICATIONS

Tian et al, Generative Adversarial Network based Speaker Adaptation for High Fidelity WaveNet Vocoder, https://arxiv.org/abs/1812.02339, Jul. 19, 2019, pp. 1-5 (Year: 2019).*
You et al., GAN Vocoder: Multi-Resolution Discriminator is All You Need, https://arxiv.org/abs/2103.05236, Aug. 23, 2021, pp. 1-5 (Year: 2021).*
Hong et al, Speech Recognition with Reminiscent sound via visual voice memory, 2021, IEEE/ACM Transactions on Audio, Speech and Language Processing, vol. 29, pp. 3654-3667 (Year: 2021).*
Shi et al, Speech Loss Compensation by Generative Adversarial Networks, Nov. 18-21, 2019, Proceedings of APSIPA Annual Summit and Conference 2019, pp. 347-351 (Year: 2019).*
Lee et a, Deep Learning Restoration of Signals with Additive and Convolution Noise, 2021, Artificial Intelligence and Machine Learning for Multi-Domain Operations Applications III, vol. 11746, pp. 1174617-1-1174617-2 (Year: 2021).*
Li, Chenxing, et al., "Single-Channel Speech Dereverberation Via Generative Adversarial Training," Proc. Interspeech 2018, reprint arXiv: 1806.09325vl, Jun. 25, 2018, 5 pages.
Pascual, Santiago, et al., "Segan: Speech Enhancement Generative Adversarial Network," arXiv preprint arXiv:1703.09452, Jun. 9, 2017, 5 pages.
Soni, Meet H., et al. "Time-Frequency Masking-Based Speech Enhancement Using Generative Adversarial Network," in 2018 IEEE International Conference on Acoustics, Speech and Signal Processing (ICASSP), IEEE, Apr. 2018, 5 pages.
Rethage, Dario, et al., "A Wavenet For Speech Denoising," in 2018 IEEE International Conference on Acoustics, Speech and Signal Processing (ICASSP), IEEE, Apr. 2018, 5 pages.
Van Den Oord Aaron, et al., "Wavenet: A Generative Model For Raw Audio.," in SSW, arXiv:1609.03499v2, Sep. 2016, 15 pages.
Tomohiro, Nakatani et al., "Speech Dereverberation Based On Variance-Normalized Delayed Linear Prediction," IEEE Transactions on Audio, Speech, and Language Processing, vol. 18, No. 7, Aug. 12, 2010, 1 page.
Duan, Zhiyao, et al., "Speech Enhancement By Online Non-Negative Spectrogram Decomposition In Nonstationary Noise Environments," in Thirteenth Annual Conference of the International Speech Communication Association, 2012, 4 pages.
Kagami, Hideaki, et al., "Joint Separation And Dereverberation of Reverberant Mixtures With Determined Multichannel Non-Negative Matrix Factorization," in 2018 IEEE International Conference on Acoustics, Speech and Signal Processing (ICASSP). IEEE, 2018, 5 pages.
Donald S. Williamson, et al., Speech Dereverberation and Denoising Using Complex Ratio Masks, in Acoustics, Speech and Signal Processing (ICASSP), 2017 IEEE International Conference on. IEEE, 2017, 5 pages.
Han, Kun, et al., "Learning Spectral Mapping For Speech Dereverberation and Denoising," IEEE/ACM Transactions on Audio, Speech and Language Processing (TASLP), vol. 23, No. 6, Jun. 2015, 11 pages.
Xu, Yong, et al., "A Regression Approach To Speech Enhancement Based On Deep Neural Networks," IEEE/ACM Transactions on Audio, Speech and Language Processing (TASLP), vol. 23, No. 1, Jan. 2015, 13 pages.
Francois G Germain, et al., "Equalization Matching of Speech Recordings in Real-World Environments," in Acoustics, Speech and Signal Processing (ICASSP), 2016 IEEE International Conference on. IEEE, Mar. 2016, 5 pages.
Kameoka, Hirokazu, et al. "Stargan-Vc: Non-Parallel Many-To-Many Voice Conversion With Star Generative Adversarial Networks," arXiv preprint arXiv:1806.02169, Jun. 2018, 9 pages.
Mysore, Gautham J., et al., "Can We Automatically Transform Speech Recorded On Common Consumer Devices In Real-World Environments Into Professional Production Quality Speech?A Dataset, Insights, And Challenges," IEEE Signal Processing Letters, vol. 22, No. 8, Dec. 2014, 5 pages.
Traer, James, et al., "Statistics Of Natural Reverberation Enable Perceptual Separation Of Sound And Space," Proceedings of the National Academy of Sciences, vol. 113, No. 48, Nov. 2016, 10 pages.
Goodfellow, Ian, et al. "Generative Adversarial Nets," in Advances in neural information processing systems, 2014, 9 pages.

\* cited by examiner

USING A PREDICTIVE MODEL TO AUTOMATICALLY ENHANCE AUDIO HAVING VARIOUS AUDIO QUALITY ISSUES

TECHNICAL FIELD

This disclosure generally relates to audio enhancement and, more specifically, to automatically enhancing audio using a predictive model to automatically enhance audio having various audio quality issues.

BACKGROUND

People make various types of audio recordings in their daily lives. For instance, recording telephonic conferences, video blogs (vlogs), voice messages, audiobooks, and others are among the recordings a person might make once or on a regular basis. Although, on some consumer devices, such as webcams or smartphones, recording is as easy as pressing a button and speaking or providing other live audio, the recordings themselves do not always have desirable quality. Environmental factors, such as background noise or poor microphone quality, can impact the resulting recordings, as can corruption of data making up the recording.

Some limited techniques exist to convert an audio recording into an improved version of the audio recording. For instance, deep learning is a machine learning technique whereby a neural network is trained to map a waveform representing an audio recording to an improved version of the audio recording in waveform. Specifically, the neural network is trained only to reduce noise, or the neural network is trained only to reduce reverberation.

In an existing system, for instance, a neural network learns to map a set of source audio to a corresponding set of target audio, where each source audio has a quality issue and the corresponding target audio is a version of the source audio without the quality issue. During training, a loss function is used to represent a comparison between predicted audio output by the neural network and target audio that is the desired output based on a source audio, and output from the loss function is used to adjust the neural network. After training, the neural network is able to generate a predicted audio from a provided source audio, where the predicted audio is the neural network's prediction of what target audio for the source audio would look like. For example, if the neural network was trained on noisy source audio along with target audio lacking noise, then the neural network is able to reduce noise in the source audio by generating predicted audio.

SUMMARY

In one embodiment, one or more processing devices perform operations to enhance audio recordings. The operations include training a prediction model to map source audios (e.g., audio recordings) to target audios (e.g., higher-quality versions of the audio recordings), and the operations further include utilizing the prediction model, after training, to convert a new source audio to a new predicted audio, which is a higher-quality version of the new source audio.

For instance, a training subsystem trains the prediction model as part of a generative adversarial network that includes both the prediction model and a discriminator to be jointly trained. The training subsystem obtains training data having a plurality of tuples including the source audios and the target audios, each tuple including a source audio in waveform representation and a corresponding target audio in waveform representation. In one example, the target audios are obtained from an existing dataset of recordings of various speakers. The training subsystem generates a set of source audios corresponding to each target audio by convolving the target audio with various room impulse responses and adding noise to the result of each such convolution, resulting in the source audios being lower-quality versions of the target audio. During training, the prediction model generates predicted audios based on the source audios in the training data. The training subsystem applies a loss function to the predicted audios and the target audios, where that loss function incorporates a combination of a spectrogram loss and an adversarial loss. The training subsystem updates the prediction model to optimize the loss function.

After training, the operations performed by the one or more processors include receiving a request to enhance a new source audio. For example, the new source audio is an audio recording that was recorded on a smartphone or other consumer device outside of a professional recording environment. A user seeks to enhance the audio recording to result in a studio-quality version of the audio recording. The operations further include, responsive to the request to enhance the new source audio, inputting the new source audio into the prediction model that was previously trained as described above. Based on the new source audio, the prediction model generates a new predicted audio as an enhanced version of the new source audio.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
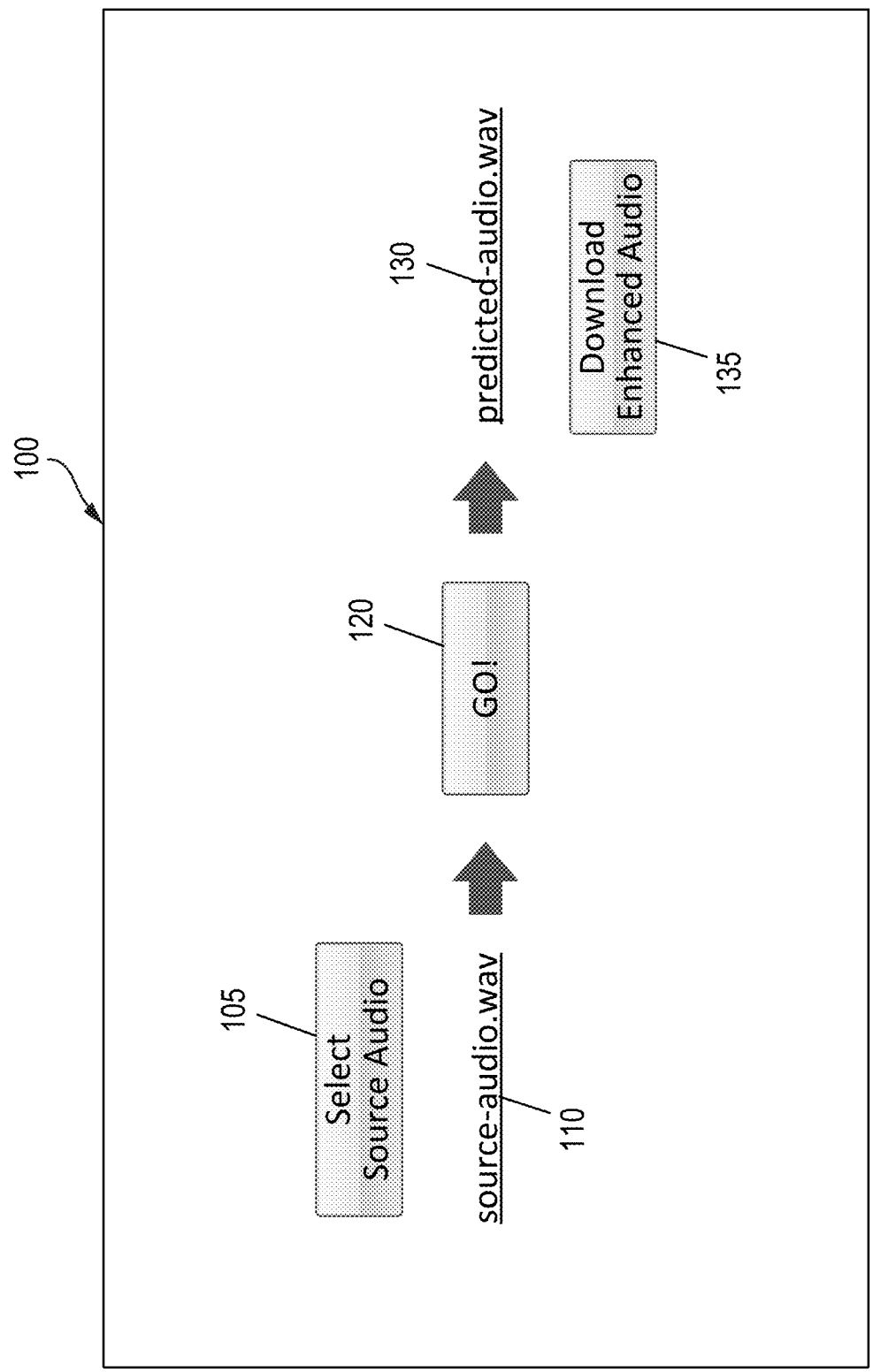
FIG. 1 illustrates an interface of an enhancement system, according to certain embodiments described herein.

Existing systems to improve audio recordings come with significant drawbacks. For instance, existing systems tend to reduce the problem to a single quality issue, such as only noise or only reverberation, and therefore address only that quality issue when improving the audio recording. The existence of multiple quality issues in audio recordings creates more complex artifacts that become difficult to identify and address by a neural network or otherwise. However, addressing each quality issue independently fails to account for the cases where multiple quality issues exist and impact the audio recording in potentially unexpected ways due to the combination.

Another existing technique treats the problem of improving audio as a source separation problem. Systems using this technique seek to separate foreground speech from background audio, such as music and environmental noise, so as to isolate the foreground speech to provide a result with the background. An example of such an existing technique separates speech from background noise by using an machine learning (ML) auto-encoder structure. However, such systems are not appropriate when the goal is to maintain both foreground and background audio in a cleaner form.

The assumptions on which existing techniques are based do not necessarily apply to real audio recordings, where both foreground and background noise are sought to be retained and where multiple quality issues can be mixed together. Additionally, however, existing techniques suffer further flaws based on the type of data they manipulate. Techniques that work in the time-frequency domain can usually match a target spectrogram (i.e., the spectrogram of target audio desired to be predicted) well because a time-frequency representation retains some time information as well as some spectral information; however, after predicting a spectrogram, such techniques have trouble recovering a waveform from the predicted spectrogram. This is because an inverse short-term Fourier transform (STFT), which is used to convert from spectrogram to waveform, requires phase information, which is typically unknown. Inaccurate phase information leads to noise and artifacts in the resulting audio, potentially adding new quality issues that did not exist in the original audio recording. Also because such techniques must choose STFT parameters, the techniques make a tradeoff between temporal resolution and frequency resolution. Although techniques that are waveform-based avoid these specific issues, such techniques typically rely on simulation for training the neural network being used. This is because popular sample-based loss functions used during training require perfect alignment between the waveform of input audio and the waveform of target audio. Such loss functions neither align with human perception of sound quality nor capture temporal structures of samples used during training.

In one example, an existing technique uses a loss function that incorporates a combination of a least absolute deviations loss function, typically referred to as an "L1" loss function, and a least squares error, typically referred to as an "L2" loss function. That existing loss function allows training only with simulated data and not with real data; real data could include phase shifts, clock drifts, and misalignment, all of which are unrecognizable given such a loss function. Further, that loss function fails to capture human perception of sound quality. Because humans hear sound in terms of frequencies rather than as a collection individual samples (i.e., discrete points) in the audio, a loss function such as this, which is based on sampling the audio, fails to enable a neural network to learn to improve audio based on human perceptions. Since each individual audio sample is treated as an individual, the temporal structure of audio is not enforced when improving a source audio provided as input during operation post-training, potentially causing a resulting predicted audio to lose the temporal structure of the source audio. This can make the predicted audio potentially unrecognizable as a version of the source audio.

Embodiments of the present disclosure includes techniques for enhancing audio. Specifically, embodiments described herein utilize a prediction model to generate a predicted waveform (i.e., predicted audio in a waveform representation) that is an enhanced version of a source waveform (i.e., source audio in a waveform representation) provided as input. The predicted waveform is high quality (e.g., studio-quality) audio, which is improved over the source audio in terms of a combination of noise, reverberation, distortion, uneven equalization, or other quality issues. Prior to operation of the prediction model, certain embodiments train the prediction model based on a loss function that combines spectrogram loss and adversarial loss. This loss function is coupled with generative adversarial training in a generative adversarial network (GAN). By training on a diverse set of speech recordings obtained from simulation and data augmentation for various types of environments, the prediction model is able to generalize to recordings of new speakers, new speech content, and new recording conditions. As a result, the prediction model can effectively enhance a wide range of audio into high-quality audio.

As used herein, the term "audio" refers to a set of audio data. Analogously, the term "audios" refers to one or multiple sets of audio data. For instance, an audio could be an audio file or portion of an audio file, and multiple audios could be multiple audio files or portions thereof. Further, as used herein, the term "source audio" refers to an audio (e.g., an audio file) having a source quality, or undesirable quality, of audio data. The term "target audio" refers to an audio (e.g., an audio file) that has a target quality, such as studio quality, which is a desired quality of audio data. The term "predicted audio" refers to an audio (e.g., an audio file) generated by a prediction model as a prediction of target audio for a given source audio.

The following non-limiting example is provided to introduce certain embodiments. In this example, an enhancement system for enhancing audio trains a prediction model to learn a mapping from source audios to target audios, where the target audios are enhanced versions of the source audios, and then utilizes the prediction model to predict predicted audios based on other source audios provided during operation. The predicted audios are enhanced versions of the other source audios.

In this example, an administrator constructs a GAN, which includes a discriminator and also includes a prediction model acting as a generator in the GAN. The administrator obtains training data to train the GAN. Specifically, for instance, the administrator extracts a set of target audios from the Device and Produced Speech (DAPS) dataset. Each target audio is a studio-quality audio recording. This dataset includes ten minutes worth of sample audio recordings from each of ten female speakers and ten male speakers. The administrator also obtains 270 room impulse responses from the Massachusetts Institute of Technology (MIT) Impulse Response Survey dataset. The administrator causes each target audio to be convolved with each room impulse response, resulting in 270 modified versions of each target audio. The administrator adds noise to each such modified version and saves the resulting versions (i.e., as modified and with added noise) as source audios. Together, each source audio and its corresponding target audio form a tuple included in the training data.

The administrator trains the GAN, including both the prediction model and the discriminator, based on the training data. During training, while the discriminator learns to distinguish authentic target audios (i.e., those in the training data) from inauthentic target audios (i.e., those generated by the prediction model), the prediction model learns to generate progressively better predicted audios (i.e., closer to the corresponding target audios) based in part on feedback from the discriminator. More specifically, during training, the prediction model generates (i.e., predicts) predicted audios based on source audios provided, and the discriminator guesses whether various audios, including both predicted audios and target audios, are authentic. During training, the prediction model is updated based a training signal output by a novel loss function, which includes a spectrogram loss component and an adversarial loss component. For a given source audio, the spectrogram loss component is based on a spectrogram representation of the predicted audio generated by the prediction model as compared to a spectrogram representation of the target audio corresponding to the source audio in the training data. The adversarial loss component is based on feedback from the discriminator.

After training, the prediction model is able to generate a predicted audio based on a source audio, where that predicted audio is meant to predict what target audio for the source audio would look like. More specifically, the predicted audio is a studio-quality version of the source audio, because the prediction model was trained to map source audios to studio-quality versions.

In this example, a user accesses the enhancement system through a web interface, which the user uses to upload an example source audio. The user then selects a submission button on the interface, which the enhancement system interprets as a request to enhance the example source audio. The enhancement system utilizes the prediction model to map the example source audio to a resulting predicted audio, which the enhancement system then provides to the user. The resulting predicted audio is a studio-quality version of the example source audio.

Certain embodiments described herein represent improvements in the technical field of audio enhancement. Specifically, some embodiments train a prediction model as part of a GAN, to enhance source audio to achieve studio-quality results even when the source audio includes multiple combined quality issues. Some embodiments of the prediction model are trained using a loss function that includes both a spectrogram loss and an adversarial loss. The combination of these losses enables the prediction model to progressively improve in a way that aligns with human perception, such that the prediction model learns to enhance audio effectively without concerning itself with small misalignments or phase shifts that would not be perceptible. Further, given the wide range of training data used in some embodiments, including audio data with multiple combined quality issues, the prediction model is able to generalize to new speakers in various environments with various combinations of quality issues.

Referring now to the drawings, FIG. 1 illustrates an interface 100 of an enhancement system, according to certain embodiments described herein. An embodiment of the enhancement system causes an interface 100, such as the one shown, for example, to be displayed to a user. The interface 100 enables the user to request that the enhancement system generate a predicted audio 130 from a source audio 110, where the predicted audio 130 is an enhanced (i.e., improved) version of the source audio 110. For instance, the source audio 110 has one or multiple quality issues, such as noise, reverberation, frequency distortion (e.g., poor equalization), or other distortion, and the resulting predicted audio 130 lacks such quality issues or at least has a reduction in such quality issues.

As shown in FIG. 1, an example of the interface 100 enables a user to indicate a source audio 110. For instance, the interface 100 includes a source interface object 105, such as a link or button, selectable by a user, such that selection of the source interface object 105 causes display of a file browser. The user can use the file browser to indicate a source audio 110. In FIG. 1, the user has already used the source interface object 105 to choose a source audio 110 titled source-audio.wav. The source audio 110 may be stored locally on a computing device that displays the interface 100 or may be stored remotely, in which case the user might provide a uniform resource locator (URL) to indicate a location of the source audio 110. It will be understood that many techniques exist for enabling the user to select the source audio 110, and an embodiment can utilize one or more of such techniques.

In some embodiments, the source audio 110 is represented as a waveform, which may be provided as a .wav file. Additionally or alternatively, however, the source audio 110 is in a compressed format or in some other audio representation. If the source audio 110 is not provided as a waveform, some embodiments of the enhancement system convert the source audio 110 a waveform, such as by decompressing the data representing the source audio 110. Various techniques are known in the art for converting audio representations to waveform, and the enhancement system can use one or more of such techniques or others.

An example of the interface 100 enables one-click audio enhancement. In other words, the interface 100 enables the user to request audio enhancement by selecting a single interface object. For instance, the interface 100 provides the user with a submission interface object 120, such as a link or button, that the user can select to request enhancement of the source audio 110. For instance, as shown in FIG. 1, the interface 100 includes a button as the submission interface object 120 with the word "Go," "Enhance," or "Convert" on it. In another example, however, the interface 100 enables the user to provide additional information, such as parameters, useable by the enhancement system when enhancing the source audio 110. After providing such additional information, the user can then select the submission interface object 120 to request enhancement according to the additional information provided.

The enhancement system receives a request from the user to enhance the source audio 110. For instance, as described above, the user's selection of an interface object can be interpreted as such a request. Responsive to receiving that request, an embodiment of the enhancement system generates a predicted audio 130 corresponding to the source audio 110 by applying a prediction model to the source audio 110. As shown in FIG. 1, the enhancement system has generated a predicted audio 130 with the filename predicted-audio.wav. Based on the source audio 110, the prediction model generates the predicted audio 130, which the interface 100 provides to the user. For instance, the interface 100 provides a results interface object 135, such as a link or button, which the user can select to stream the predicted audio 130 or to store the predicted audio 130 on a local or remote computing device.

Figure 2:
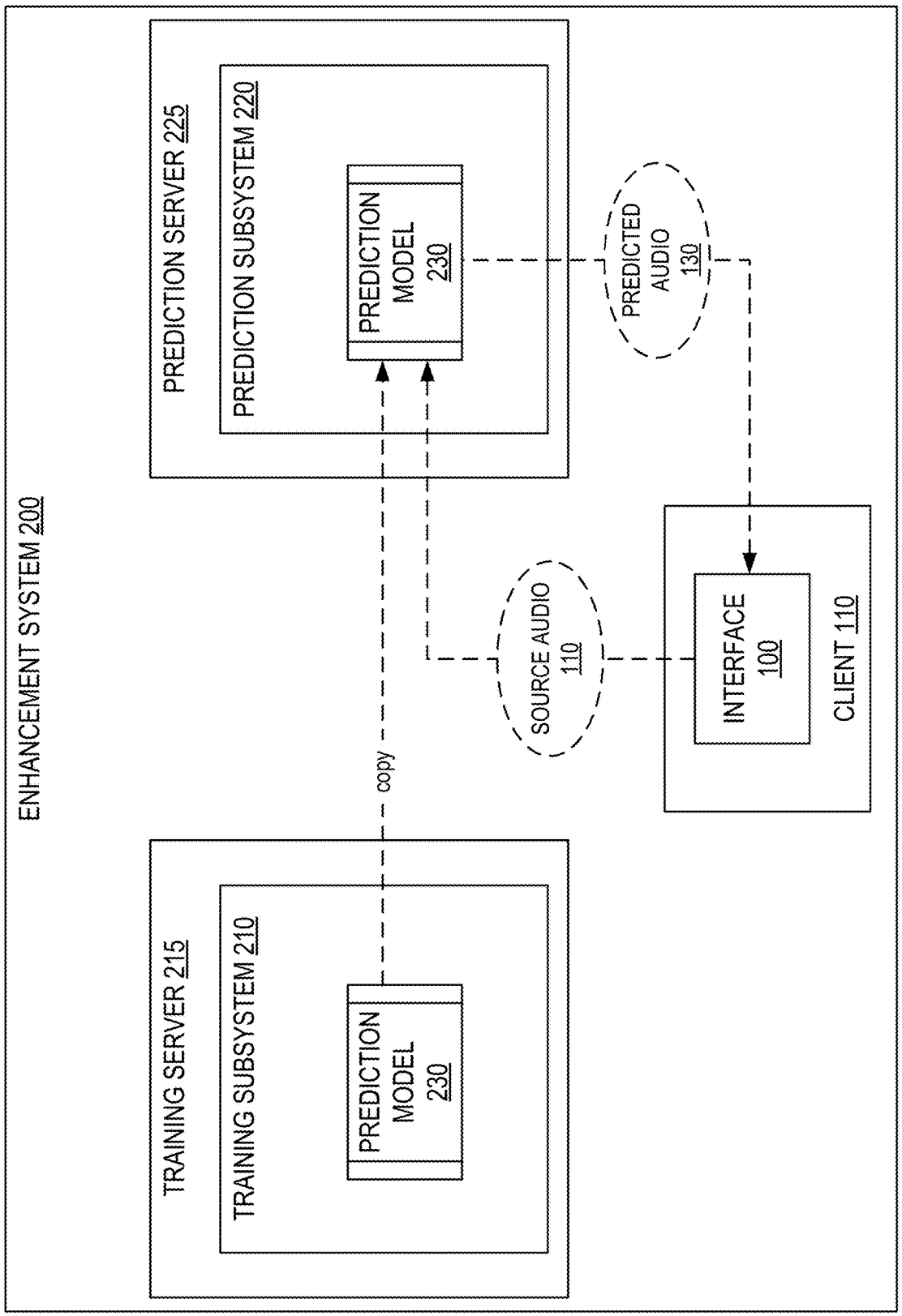
FIG. 2 is a diagram of an example architecture of the enhancement system, according to certain embodiments described herein.

FIG. 2 is a diagram of an example architecture of the enhancement system 200 according to certain embodiments described herein. As shown in FIG. 2, an embodiment of the enhancement system 200 includes a training subsystem 210 and a prediction subsystem 220. Generally, the training subsystem 210 trains a prediction model 230 to learn a mapping between source audios 110 and target audios, thereby causing the prediction model 230 to be able to generate predicted audios 130 (i.e., predictions of hypothetical target audios) based on new source audios 110; the prediction subsystem 220 receives a new source audio 110 and uses the prediction model 230, after training, to generate a corresponding predicted audio 130. In certain embodiments, the prediction model 230 is implemented as a neural network, but it will be understood that other machine-learning models might be used additionally or alternatively to a neural network. The interface 100 discussed above provides access to the prediction subsystem 220, enabling a user to request that the prediction subsystem 220 enhance a new source audio 110 by generating a corresponding predicted audio 130.

In the example of FIG. 2, the training subsystem 210 and the prediction subsystem 220 are maintained on respective servers, specifically a training server 215 and a prediction server 225 respectively. The training server 215 could be, for instance, a server utilized for software development or administrative tasks. For instance, the training server 215 could be under the control of a company that produces all or a portion of an application embodying part of a portion of the prediction subsystem 220. The prediction server 225 could be, for example, a web server that services a website useable to enhance audio by generating predicted audio 130. In that case, the interface 100 described above could be integrated into a web page of that website. An example of the training server 215 is implemented as one or more computing nodes, and further, an example of the prediction server 225 is implemented as one or more computing nodes that may be distinct from or overlap with the computing nodes of the training server 215.

Prior to use of the prediction model 230 to enhance audio as part of the prediction subsystem 220, the training subsystem 210 trains the prediction model 230. To this end, an example of the training subsystem 210 employs deep learning to update the prediction model 230, which is implemented as a neural network in some embodiment, so as to teach the prediction model 230 a mapping from source audios 110 to target audios in a set of training data. The training subsystem 210 will be described in more detail below. However, after training, the prediction model 230 may be accessible by the prediction subsystem 220, For instance, in the example of FIG. 2, in which the training subsystem 210 and the prediction subsystem 220 run on distinct servers, the training server 215 copies (i.e., transmits) the trained prediction model 230 to the prediction server 225 for user by the prediction subsystem 220. As such, the prediction subsystem 220 can utilize the prediction model 230 to enhance audio.

As also shown in FIG. 2, in some embodiments, a client 240 can access the enhancement system 200; specifically, for instance, the client 240 accesses the prediction subsystem 220 of the enhancement system 200 on behalf of a user to enhance source audio 110 provided by the user. For instance, the user operates the client 240. In one example, the client 240 is a computing device, such as a notebook computer, a desktop computer, a tablet, or a smartphone, but it will be understood that the client 240 could be one or a combination of various computing devices. In some embodiments, the client 240 connects to the prediction subsystem 220, which provides the interface 100 to the client 240 for display to the user. The client 240 provides the source audio 110 to the prediction subsystem 220 and receives an indication of the predicted audio 130 after generation of the predicted audio 130. For instance, the user can indicate the source audio 110 to the client 240, such as through the interface 100 displayed at the client 240. An example of the client 240 accesses the source audio 110 and transmits the source audio 110 to the prediction subsystem 220, or additionally or alternatively, if the source audio 110 is stored remotely from the client 240, an example of the client 240 indicates the source audio 110 to the prediction subsystem 220, which then retrieves the source audio 110.

In the example of FIG. 2, upon receiving source audio 110 and a request to enhance the source audio 110, both of which can be provided through the interface 100 or otherwise, an embodiment of the prediction subsystem 220 enhances the source audio 110. To this end, the prediction subsystem 220 applies the prediction model 230 to the source audio 110, causing the prediction model 230 to generate a predicted audio 130 corresponding to the source audio 110. The predicted audio 130 is an enhanced version (e.g., a studio-quality version) of the source audio 110. The prediction subsystem 220 provides the predicted audio 130 to the client 240, such as by transmitting the predicted audio 130 to the client 240 or by transmitting to the client 240 a reference to (e.g., an URL) the predicted audio 130. An example of the client 240 then provides the predicted audio 130 to the user as an enhanced version of the source audio 110.

Although not shown in FIG. 2, in an alternative architecture, the prediction subsystem 220 including the prediction model 230 is stored locally on the client 240 rather than residing at a prediction server 225. In that case, rather than enhancement of the source audio 110 occurring remotely (e.g., as a cloud service), the enhancement occurs locally at the client 240. In some cases, this can enable the user to utilize the enhancement system 200 offline (i.e., without access to a remote server). In such an embodiment, the prediction server 225 need not be a distinct device from the client 240 as shown in FIG. 2. Rather, the prediction server 225 is integrated with the client 240.

An example of the prediction subsystem 220 is integrated into, or accessible by, an application that enhances audio. For example, such an application is an audio-related or video-related product, such as Adobe® Audition, Adobe Premiere, or Adobe Spark. In the example of FIG. 2, for instance, that application has a client portion that runs on the client 240 and communicates with a cloud service managed by the prediction server 225. In the case where the prediction subsystem 220 operates on the client 240, however, the application is a local application that need not communicate with a remote server to generate predicted audios 130. Through access to the prediction subsystem 220, the application is configured to enhance audio by applying the trained prediction model 230 to source audio 110 to generate prediction audio that is potentially studio quality.

Figure 3:
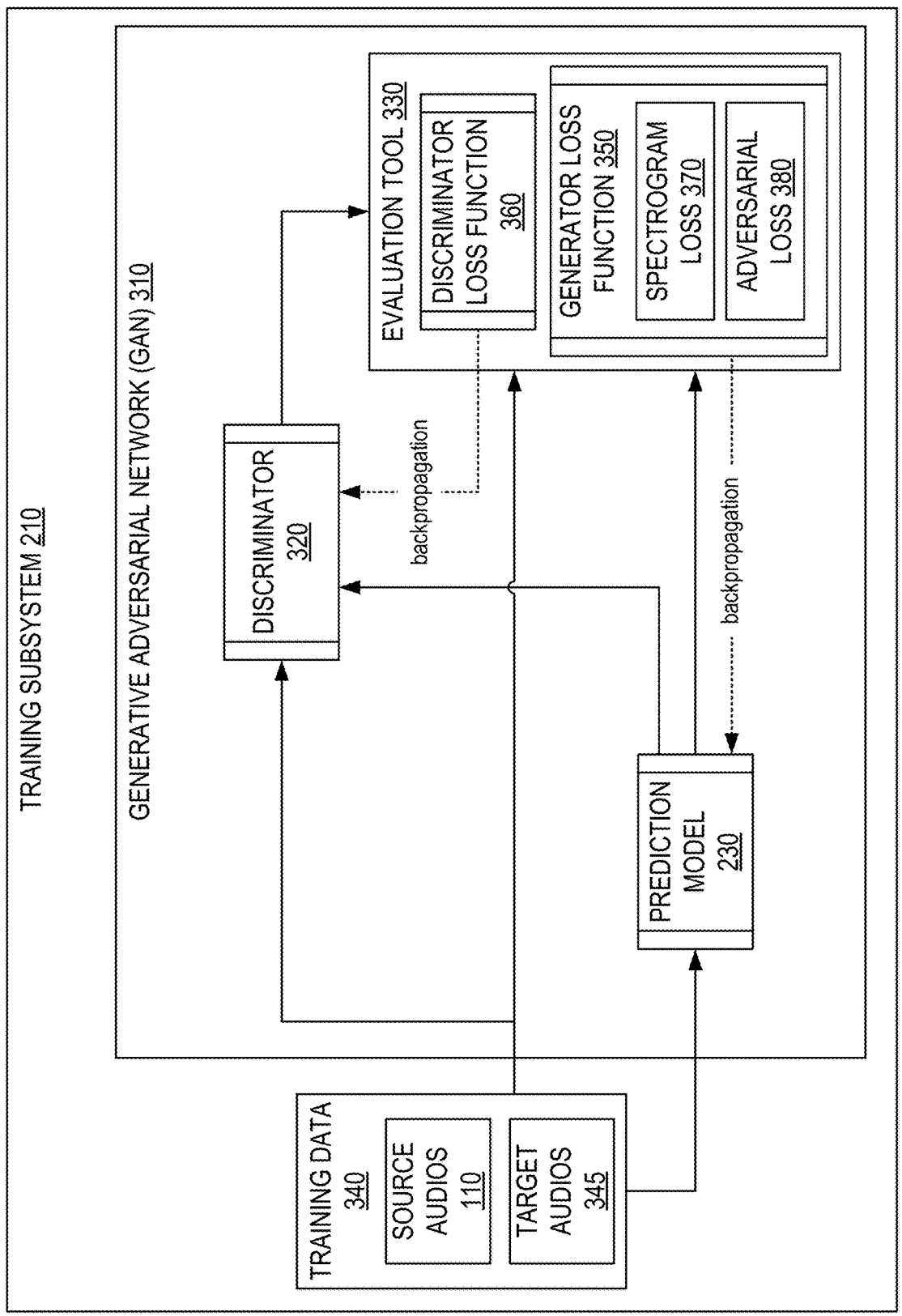
FIG. 3 is a block diagram of a training subsystem of the enhancement system, according to certain embodiments described herein.

Prior to being put into operation in the prediction subsystem 220, an embodiment of the training subsystem 210 trains the prediction model 230. FIG. 3 is a block diagram of the training subsystem 210 according to some embodiments. As shown in FIG. 3, the training subsystem 210 includes a generative adversarial network 310, which is used to train the prediction model 230 as well as to train a discriminator 320. In this GAN 310, the prediction model 230 itself is a neural network acting as a generator, which is trained jointly with the discriminator 320 in an adversarial manner. The GAN 310 of the training subsystem 210 further includes an evaluation tool 330, which applies one or more objective functions, also referred to as loss functions, to modify the prediction model 230, the discriminator 320, or both. One of skill in the art will understand how to construct a GAN 310 in general and, thus, given this disclosure, how to construct a GAN 310 as described herein.

Within the GAN 310, the prediction model 230, acting as a generator, learns to generate predicted audio 130 given source audio 110, while the discriminator 320 learns to determine whether audio provided to the discriminator 320 is authentic (i.e., is target audio that is an enhanced version of the source audio 110). The GAN 310 is thus adversarial in nature because the prediction model 230 and the discriminator 320 compete against each other and thus improve jointly. As the prediction model 230, the discriminator 320 must improve in order to continue identifying fakes (i.e., audios other than target audios of input source audios 110), and as the discriminator 320 improves, the generator must improve to continue producing predicted audios 130 capable of fooling the discriminator 320. Thus, the adversarial nature of the GAN 310 and of the training subsystem 210 causes the prediction model 230 to learn how to convert source audios 110 into corresponding predicted audios 130 (i.e., to generate predicted audios 130 based on source audios 110) that are close to the corresponding target audios.

In the training subsystem 210, the prediction model 230 learns how to predict audio (i.e., to generate predicted audio 130) based on training data 340. Generally, the training data 340 includes a set of tuples, each tuple including a source audio 110 and a corresponding target audio 345. In some embodiments, for each such tuple, the target audio 345 is a high quality (e.g., studio quality) version of the corresponding source audio 110. Generally, the training subsystem 210 seeks to teach the prediction model 230 how to generate predicted audio 130 that matches the target audio 345 for each source audio 110 in the training data 340. In other words, an example of the prediction model 230 learns a mapping of source audios 110 having source quality to target audios 345 having target quality, such as studio quality. As a result, the prediction model 230 is then potentially able to generate a new predicted audio 130 for a new source audio 110 that is not part of the training data 340, where that predicted audio 130 is of the target quality.

To facilitate teaching the prediction model 230 and the discriminator 320, an embodiment the evaluation tool 330 executes a generator loss function 350 and a discriminator loss function 360. As described in more detail below, the generator loss function 350 includes both a spectrogram loss 370 and an adversarial loss 380. Based on application of the generator loss function 350 to target audios 345 in the training data 340, predicted audios generated by the prediction model during training, and scores computed by the discriminator 320 during training, the evaluation tool 330 updates the prediction model to better represent the mapping from source audios to target audios 345 in the training data 340. Additionally, based on application of the discriminator loss function 360 to scores computed by the discriminator 320 during training, the evaluation tool 330 updates the discriminator 320 to better identify authentic target audios 345.

Figure 4:
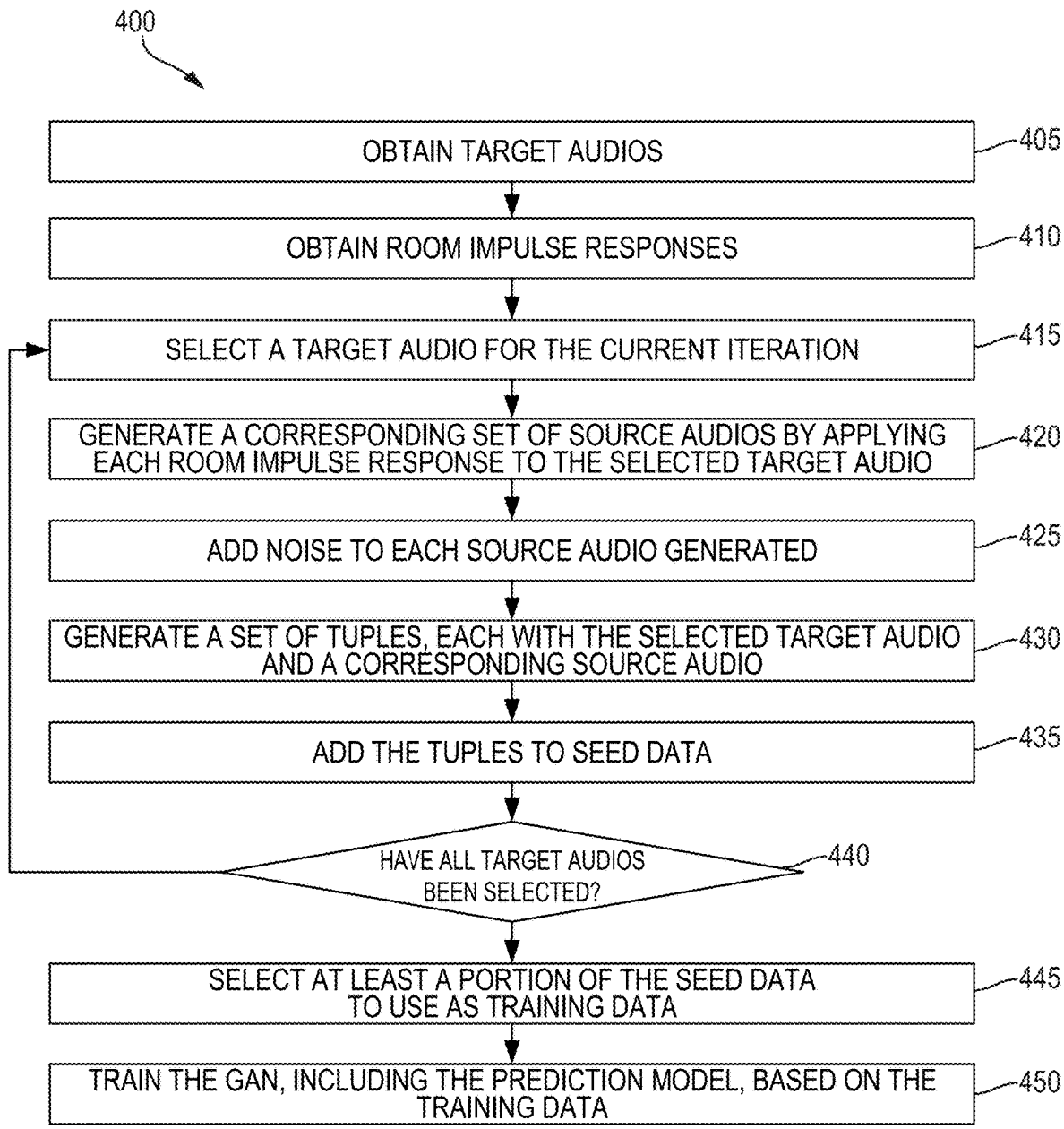
FIG. 4 is a flow diagram of a process of training a prediction model of the enhancement system, according to certain embodiments described herein.

FIG. 4 is a flow diagram of a process 400 of training a prediction model 230 to map source audios 110 to corresponding target audios 345, so as to teach the prediction model 230 to predict audios corresponding to new source audios 110, according to some embodiments. Generally, some embodiments described herein acquire seed data for use in training the prediction model 230. All or a portion of the seed data is used as training data 340. An example of seed data includes a set of tuples, each tuple including a source audio 110 and a target audio 345 corresponding to the source audio 110. In the seed data, each tuple need not include unique target audio 345; rather, as described in the below, a particular target audio 345 may be included in multiple tuples, paired with a different corresponding source audio 110 in each such tuple. As described below, in some embodiments, the training subsystem 210 receives a first portion of the seed data (e.g., target audios 345) and simulates (e.g., generates by simulation) a second portion of the seed data (e.g., source audios 110) based on that first portion.

The process 400 of the training subsystem 210 begins at block 405 of the flow diagram shown in FIG. 4. Prior to block 405, however, the seed data is empty or includes seed data collected previously. However, additional tuples are added to the seed data as described below, specifically at blocks 405 through 440.

As shown in FIG. 4, block 405 of the process involves obtaining (i.e., receiving) target audios 345. In some embodiments, each such target audio 345 obtained is a studio-quality sample of audio. More generally, each such target audio 345 is an example of acceptable output desired to be generated by the prediction model 230.

The training subsystem 210 can obtain the target audios 345 in various ways. In one example, the training subsystem 210 downloads or otherwise receives the target audios 345 from an existing data set, such as the DAPS dataset. At this time, the DAPS dataset includes a ten-minute audio clip from each of twenty speakers, including ten male voices and ten female voices, and an example of the training subsystem 210 downloads these audio clips to use each as a target audios 345. For instance, the training subsystem 210 can use each ten-minute clip as a target audio 345, or the training subsystem 210 can divide each ten-minute clip into smaller clips, such that each smaller clip is used as a target audio 345.

In some embodiments, the training subsystem 210 trains the GAN 310 with target audios 345 and source audios 110 in waveform representations. Thus, the training subsystem 210 receives the target audios 345 as waveforms, or the training subsystem 210 converts each target audio 345 to a corresponding waveform. For instance, if a target audio 345 is received in a compressed format, the training subsystem 210 decompresses the compressed format to extract a version of the target audio 345 that is an uncompressed waveform. As described below, some embodiments of the training subsystem 210 generate source audios 110 based on the target audios 345, where each corresponding source audio 110 of a target audio 345 is a reduced-quality version of the target audio 345. Thus, given the target audios 345 are in waveform representations, the source audios 110 generated below are generated as waveforms in some embodiments as well.

At block 410, the process 400 involves obtaining a set of room impulse responses. A room impulse response describes how sound changes between its source (e.g., a speaker) and a microphone that records the resulting audio. Thus, the room impulse response associated with a specific environment reflects how environmental factors (e.g., reverberation and background noise) impact sound as recorded in that environment. In one example, the room impulse responses are extracted or otherwise received from the MIT Impulse Response Survey dataset, which currently includes 270 room impulse responses. As described below, in this example process 400, the room impulse responses are used to reduce the quality of the target audios 345 so as to generate source audios 110. It will be understood, however, that other techniques exist and can be used to generate the source audios 110 based on the target audios 345.

Block 415 of the process 400 begins an iterative loop, where, in each iteration of the loop, the training subsystem 210 generates a corresponding set of source audios 110, including one or multiple source audios 110, based on a given target audio 345. At block 415, the process 400 involves selecting a target audio 345 to associate with the current iteration of the loop, where source audios 110 have not yet been generated for the selected target audio 345 in prior iterations of the loop. Specifically, for instance, from among the target audios 345 received at block 405, the training subsystem 210 selects one of such target audios 345 for which source audios 110 have not yet been generated in a prior loop, if any such prior loops exist.

At block 420, the process 400 involves applying each room impulse response to the selected target audio 345 to generate a set of source audios 110. For instance, the training subsystem 210 convolves the selected target audio 345 with each room impulse response separately, resulting in a set of source audios 110 in the same quantity as the set of room impulse responses used. In this case, the set of source audios 110 resulting includes a corresponding source audio 110 for each room impulse response applied, and all such source audios 110 are based on and therefore correspond to the selected target audio 345. In some embodiments, these resulting source audios 110 are intermediate and are further modified prior to training the prediction model 230, as described below.

At block 425, the process 400 involves adding noise to each source audio 110 that was generated at block 420 based on the selected target audio 345. For instance, the training subsystem 210 adds noise to each source audio 110, such as by adding noise extracted from a Gaussian distribution, resulting in an updated version of the source audio 110 that includes noise and still corresponds to the selected target audio 345. Thus, after adding noise to each source audio 110, the selected target audio 345 is now associated with a set of source audios 110 that include additional noise. In some embodiments, however, the training subsystem 210 does not add noise to the source audios 110, and in that case, block 425 is skipped.

At block 430, the process 400 involves generating a set of tuples corresponding to the selected target audio 345. For instance, the training subsystem 210 generates a respective tuple associated with each source audio 110 generated at block 425, if noise is being added, or generated at block 420, if noise is not being added. Such a tuple includes the source audio 110 as well as the selected target audio 345 on which the source audio 110 is based. Thus, in some embodiments, for the selected target audio 345, the training subsystem 210 constructs a set of tuples having a quantity equal to the quantity of source audios 110, which can be equal to the quantity of room impulse responses used. This set of tuples associated with the selected target audio 345 is a subset of the tuples that make up the seed data, which can include not only the selected target audio 345, but also other target audios 345 obtained at block 405.

At block 435, the process involves adding the tuples generated at block 430 to seed data used to train the prediction model 230. For instance, the training subsystem 210 updates the seed data by adding each tuple, including the selected target audio 345 and a corresponding source audio 110, to the seed data.

At decision block 440, the training subsystem 210 determines whether all target audios 345 have been selected in block 415 and have has associated source audios 110 generated. If any target audios 345 have not yet been selected, then the process 400 returns to block 415, where another target audio 345 is selected. However, if all target audios 345 have been selected and have had corresponding source audios 110 generated, then the process 400 continues to block 445.

At block 445, the process 400 involves selecting at least a portion of the seed data to use as training data 340. In some embodiments, not all of the seed data is used as training data 340 to train the GAN 310. Rather, an example of the training subsystem 210 sets aside a portion of the seed data for validation and testing of the prediction model 230, and that portion is not included in the training data 340. For instance, in the above example, in which the target audios 345 include ten minutes of audio for each of twenty speakers, including ten male voices and ten female voices, the training subsystem 210 identifies target audios 345 corresponding to two minutes of audio from one female voice and two minutes of audio from one male voice. From among those identified target audios 345, the training subsystem 210 selects a subset of the corresponding tuples that represent seventy environments (i.e., seventy room impulse responses). The training subsystem 210 extracts those selected tuples to be used for validation and testing, rather than as training data 340. The training subsystem 210 uses the remaining seed data as training data 340.

At block 450, the process 400 involves training the prediction model 230 within the GAN 310. For instance, the training subsystem 210 utilizes the training data 340 selected at block 445 to train the GAN 310 and, thus, to train the prediction model 230. Due to being trained based on this diverse set of training data 340 including multiple speakers and multiple environments, the prediction model 230 is able to generalize its learning to recordings of new speakers, new speech content, and new recording environments.

Training within the GAN 310 utilizes one or more loss functions, as will be described further below, to update the prediction model 230 and the discriminator 320. Given this disclosure, one of skill in the art will understand how to utilize the training data 340 to train the prediction model 230 in the GAN 310, utilizing one or more loss functions. However, embodiments described herein can utilize a novel set of loss functions, as described in more detail below.

In some embodiments, the training subsystem 210 trains the prediction model 230 of the GAN 310 for at least one million iterations with a batch size of ten using an Adam optimization algorithm with an initial learning rate of 0.001, reduced by a factor of ten every three hundred thousand iterations. Given the pre-trained prediction model 230, the training subsystem 210 trains the discriminator 320 from scratch for five thousand iterations while keeping the generator fixed. The training subsystem 210 then performs joint training on both the prediction model 230 and the discriminator 320.

It will be understood that the process 400 described above is provided for illustrative purposes only and, further, that the process 400 could vary while remaining within the scope of this disclosure. For instance, operations of the iterative loop as described above form one example implementation, and one of skill in the art will understand that various implementations are possible to utilize simulation to generate source audios 110 based on target audios 345. For instance, although the above describes the tuples as being constructed inside the loop, an alternative embodiment might construct the tuples after all iterations of the loop have been performed and source audios 110 have already been generated for all target audios 345. In another example, block 425 is skipped and no noise is added to the source audios 110. One of skill in the art will understand that other implementations are also possible for the process 400.

In some embodiments, the training subsystem 210 performs one or more tasks to overcome overfitting of the prediction model 230. For example, the training subsystem 210 generates augmented versions of the target audios 345 prior to generating the corresponding source audios 110, and the training subsystem 210 bases the source audios 110 on the augmented versions, although the original versions of the target audios 345 are used in the tuples of the seed data. In other words, at block 420, the impulse control responses are applied to the augmented versions rather than to the original target audios 345 themselves. A target audio 345 is augmented, for instance, by re-scaling its volume, changing its speed via linear interpolation, or both. For another example, the training subsystem 210 augments one or more room impulse responses before applying such room impulses to the target audios 345, regardless of whether the target audios 345 have been augmented themselves; for instance, a room impulse response is augmented by re-scaling the energy of its reverberation while keeping its direct signal the same, by changing reverberation time such as via nearest neighbor interpolation, or by the use of both such techniques. For another example, when the noise is added at block 425, the training subsystem 210 adds that noise to various source audios 110 at various signal-to-noise ratios ranging from, for instance, twenty decibels to thirty decibels, resulting in a relatively wide range of noise being added to the source audios 110 for a given target audio 345.

In general, training a GAN 310 requires use of one or more loss functions (i.e., objective functions), for instance including a first loss function for training the generator and a second loss function for training the discriminator 320. Some embodiments of the training subsystem 210 utilize a novel set of loss functions so as to train the prediction model 230, acting as the generator, to learn a mapping between source audios 110 and target audios 345.

In some embodiments, to train the prediction model 230 in the GAN 310, the training subsystem 210 utilizes a generator loss function 350 to train the prediction model 230, where the generator loss function 350 is designed in consideration of human perceptions. In other words, the generator loss function 350 is perceptually motivated in that it incorporates an aspect of spectrogram loss 370, which discounts small misalignments and phase shifts that are typically not perceivable. For instance, the generator loss function 350 includes a spectrogram loss 370, or spectrogram loss component, based on a spectrogram representation of the predicted audio 130 as compared to a spectrogram representation of the target audio 345, and the generator loss function 350 further includes an adversarial loss 380, or adversarial loss component, that is based on feedback from the discriminator 320.

More specifically, to determine the spectrogram loss 370, an example of the training subsystem 210 computes the L2 difference (i.e., the least squares error) of the log spectrogram of a predicted waveform (i.e., the predicted audio 130 in a waveform representation) as compared to a target waveform (i.e., the target audio 345 in a waveform representation). In some embodiments, the spectrogram loss 370 is invariant to small misalignments between the source waveform (i.e., the source audio 110 is waveform representation) and the target waveform during training. As such, the spectrogram loss 370 is therefore better in accordance with human perception of speech quality, compared to popular L1 or L2 sample-based (i.e., based on consideration of discrete points, or samples) loss functions.

In some embodiments, join training in conjunction with the discriminator 320 removes noise and artifacts in predicted waveforms. The discriminator 320 tries to distinguish between output of the prediction model 230 and authentic clean speech not outputted by the prediction model 230. Through training, the discriminator 320 learns to identify telltale artifacts that occur during generation by the prediction model 230. Meanwhile, the prediction model 230 improves its fidelity as it learns to fool the discriminator 320 in an adversarial manner, and doing so causes such telltale artifacts to be reduced over time. Further, in some embodiments such as the below example, the generator loss function 350 and the discriminator loss function 360 are differentiable, and thus, some embodiments of the training subsystem 210 use standard forward and back propagation to train the prediction model 230 and the discriminator 320.

Specifically, in one example GAN 310, in which x represents a source audio 110 from the training data 340, x' represents a target audio 345 from the training data 340, and the tuple (x, x') includes the source audio x and the target audio x', the prediction model G acting as the generator optimizes (e.g., minimizes) a generator loss function $L_G$, which is the sum of a spectrogram loss 370 and adversarial loss 380 as follows:

$$L_G(x,x') = \alpha|\text{Log Spec}(G(x)) - \text{Log Spec}(x')| + \beta(1-D(\text{Log Mel}(G(x))))$$

Additionally, in the example GAN 310, the discriminator D optimizes (e.g., minimizes) a discriminator loss function $L_D$ as follows:

$$L_D(x,x') = D(\text{Log Mel}(G(x))) + 1 - D(\text{Log Mel}(x'))$$

In the above, Log Spec represents the log spectrogram, and Log Mel represents the log mel-spectrogram. The values for $\alpha$ and $\beta$ are weighting factors.

As mentioned above, an embodiment of the generator loss function 350 incorporated both a spectrogram loss 370 and an adversarial loss 380. Specifically, in the above example formula for the generator loss function 350, |Log Spec(G(x))−Log Spec(x')| represents a spectrogram loss 370 because this difference is the difference between the log spectrogram of the predicted audio 130 and the log spectrogram of the target audio 345, and 1−D(Log Mel(G(x)) represents an adversarial loss 380 because this difference is the discriminator score of the log mel-spectrogram of the predicted audio 130 subtracted from the desired discriminator score of 1, where a discriminator score of 1 would indicate a discriminator 320 finding of authenticity at the highest likelihood. Thus, the above generator loss function 350 includes a combination of spectrogram loss 370 and adversarial loss 380. Further, in some embodiments, the weighting factors $\alpha$ and $\beta$ for that combination are selected such that the spectrogram loss 370 and the adversarial loss 380 are considered roughly at the same magnitude or, in other words, such that $\alpha$|Log Spec(G(x))−Log Spec(x')| and $\beta$(1−D(Log Mel(G(x)))) are equal or nearly equal.

In some embodiments, the training subsystem 210 computes multiple spectrogram losses |Log Spec(G(x))−Log Spec(x')|, each with a different set of STFT parameters (e.g., a different Log Spec function), and sums the multiple spectrogram losses together. For instance, the multiple spectrogram losses are added together with equal weighting (i.e., without scaling). In one example, the training subsystem 210 uses an equally weighted combination of two spectrogram losses with two sets of STFTs for the sampling rate of 16 kHz: one spectrogram loss with a relatively large fast Fourier transform (FFT) window size of 2048 and a hop size of 512, and another spectrogram loss with a smaller FFT window size of 512 and a hop size of 128. The larger FFT window size gives more frequency resolutions, and the smaller FFT window size gives more temporal resolutions. For the discriminator 320, this example training subsystem 210 uses kernel sizes of (3, 9), (3, 8), (3, 8), and (3, 6), stride sizes of (1, 2), (1, 2), (1, 2), and (1, 2), and channel sizes of (1, 32), (32, 32), (32, 32), (32, 32) respectively for the sequence of the network layers. The input to the discriminator 320 is computed as the log of mel-spectrogram with 80 mel bandpass filters ranging from 80 Hz to 7600 Hz, using the STFT parameters of large FFT window.

Figure 5:
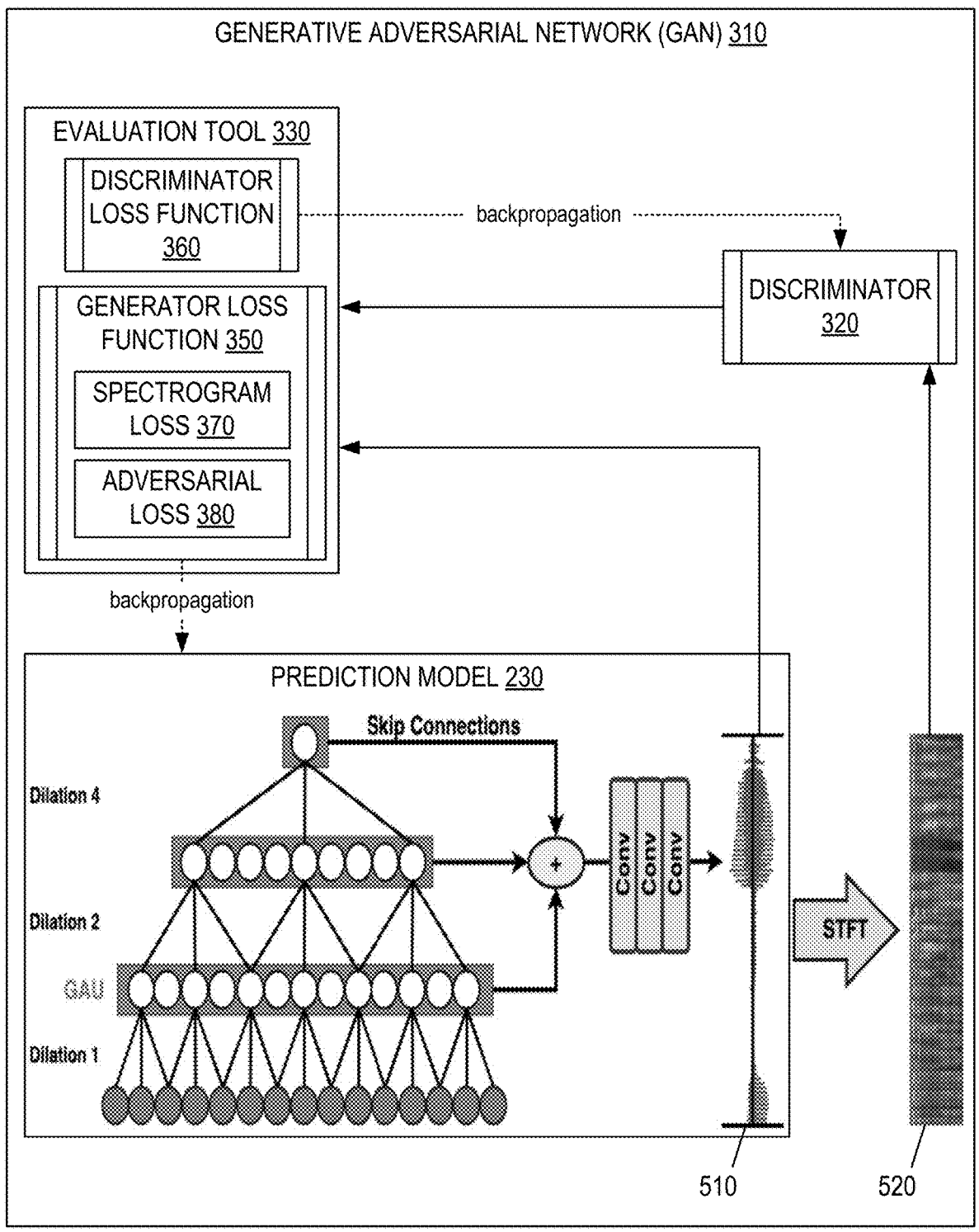
FIG. 5 shows an example architecture of the prediction model as trained in a generative adversarial network, according to certain embodiments described herein.

FIG. 5 shows an example architecture of the prediction model 230 within the GAN 310, according to some embodiments. Specifically, an example of the prediction model 230 is the same as, or similar to, the feed-forward WaveNet architecture as presented in the work of Rethage, Pons, and Serra (Dario Rethage, "A Wavenet for Speech Denoising," *IEEE International Conference on Acoustics, Speech and Signal Processing*, 2019, pp. 5039-5043). As shown in FIG. 5, in some embodiments, the training subsystem 210 trains the prediction model 230 and the discriminator 320, specifically, based on training data 340 that includes source audios 110 and target audios 345. As is further shown, the training subsystem 210 trains the prediction model 230 using a training signal output by the generator loss function 350, which includes both a spectrogram loss 370 and an adversarial loss 380 as described above.

An example of the prediction model 230 generates predicted audios 130 in waveforms (i.e., predicted waveforms 510). Although training data 340 is not shown in FIG. 5, the generation of such predicted audios 130 is based on corresponding source audios 110 in the training data 340 in some embodiments, as described above. An example of the training subsystem 210 applies a STFT to the predicted waveforms 510 to generate predicted spectrograms 520, which are spectrogram representations of the predicted audios 130. The training subsystem 210 provides to the discriminator 320 the predicted spectrograms 520 generated during training as well as target spectrograms, which are spectrogram representations of target audios 345 in the training data 340. The discriminator 320 predicts which of the various spectrograms received are authentic (i.e., are target spectrograms); specifically, the discriminator 320 generates a score associated with each spectrogram to indicate the likelihood that the spectrogram is authentic.

As also shown in FIG. 5, an evaluation tool 330 is configured to apply the generator loss function 350 and the discriminator loss function 360. In some embodiments, for a given source audio 110 in the training data 340, the evaluation tool 330 applies the generator loss function 350 to the corresponding target audio 345, predicted audio 130, and discriminator score for the predicted audio 130 (e.g., according to the formula for the generator loss function 350 described above) to determine a generator loss value. Various such generator loss values together form a generator training signal, where that generator training signal is used by the training subsystem 210 to update the weights of nodes within the neural network of the prediction model 230 so as to train the prediction model 230 through backpropagation. Analogously, the evaluation tool 330 applies the discriminator loss function 360 to the corresponding discriminator score of the predicted audio 130 and the discriminator score of the target audio 345 (e.g., according to the formula for the discriminator loss function 360 described above) to determine a discriminator loss value. Various such discriminator loss values together form a discriminator training signal, where that discriminator training signal is used by the training subsystem 210 to update the weights of nodes within the neural network of the discriminator 320 so as to train the discriminator 320 through backpropagation.

As is also shown in FIG. 5, an example of the prediction model 230 is implemented as a neural network including stacks of one-dimensional (1D) dilated convolutions. The dilation rates exponentially increase for each layer up to a limit and then repeat. The prediction model 230 further includes one or more Gated Activation Units (GAU) for nonlinearity. Where $x_k$ is input from previous layers into the $k^{th}$ block, $W_{f,k}$ and $W_{g,k}$ are weights for dilated convolutions in the $k^{th}$ block, and $W_{r,k}$ and $W_{s,k}$ are weights for non-dilated convolutions in the $k^{th}$ block, a unit block of the prediction model 230 performs the following computations, where $z_k$, $z_{r,k}$, and $z_{s,k}$ and intermediate values used to compute $x_{k+1}$:

$$z_k = \tanh(W_{f,k} \otimes x_k) \odot \sigma(W_{g,k} \otimes x_k)$$

$$z_{r,k} = W_{r,k} \otimes z_k$$

$$z_{s,k} = W_{s,k} \otimes z_k$$

$$x_{k+1} = x_k + z_{r,k}$$

In some embodiments, in each unit block, the prediction model 230 uses both a residual connection and a skip connection. The value of $x_{r,k}$ is computed for the residual connection and is added to the input of the current block to construct input to the next block. To generate the prediction, as shown in FIG. 5, the prediction model 230 sums outputs $z_{s,k}$, for all k, from the various skip connections. To the resulting sum, the prediction model 230 applies Rectified Linear Unit (ReLU) followed by three 1D non-dilated convolutions in sequence during post-processing. The last of the three 1D non-dilated convolutions uses a filter width of 1 and projects the channel dimension to 1. This gives a real-valued sample sequence as the predicted waveform 510. In some embodiments, the channel size is 128 across the entire neural network because, for instance, the source waveform is projected to 128 channel dimensions using 1D non-dilated convolution during preprocessing. Some embodiments use a filter width of 3 for the dilated convolutions and post-processing, and a filter width of 1 for skip connections and residual connections. As mentioned above, the dilation rates exponentially increase for each layer up to a limit and then repeat. Specifically, for instance, the sequence of dilation rates is, for example, (1, 2, 4, 8, 16, 32, 64, 128, 256, 512). The prediction model 230 includes two such stacks dilated convolutions, resulting in a total of 20 layers.

Generally, the discriminator 320 takes in the log mel-spectrogram of target audios 345 and predicted audios 130 and, based on the log mel-spectrogram, outputs a prediction for each. For instance, that prediction is a score indicating a believed likelihood that the target audio 345 or predicted audio 130 is authentic (i.e., is a target audio 345). An example discriminator 320 takes the structure described in StarGAN-VC (Hirokazu Kameoka, Takuhiro Kaneko, Kou Tanaka, and Nobukatsu Hojo, "StarGAN-VC: Non-Parallel Many-to-Many Voice Conversion with Star Generative Adversarial Networks," arXiv preprint arXiv:1806.02169, 2018). The example of the discriminator 320 is a gated convolutional neural network (CNN) with several stacks of convolutional layers, a batch normalization layer, and a Gated Linear Unit (GLU). In some embodiments, the discriminator 320 is fully convolutional, thus allowing inputs of arbitrary temporal length (i.e., audios of various lengths).

Figure 6:
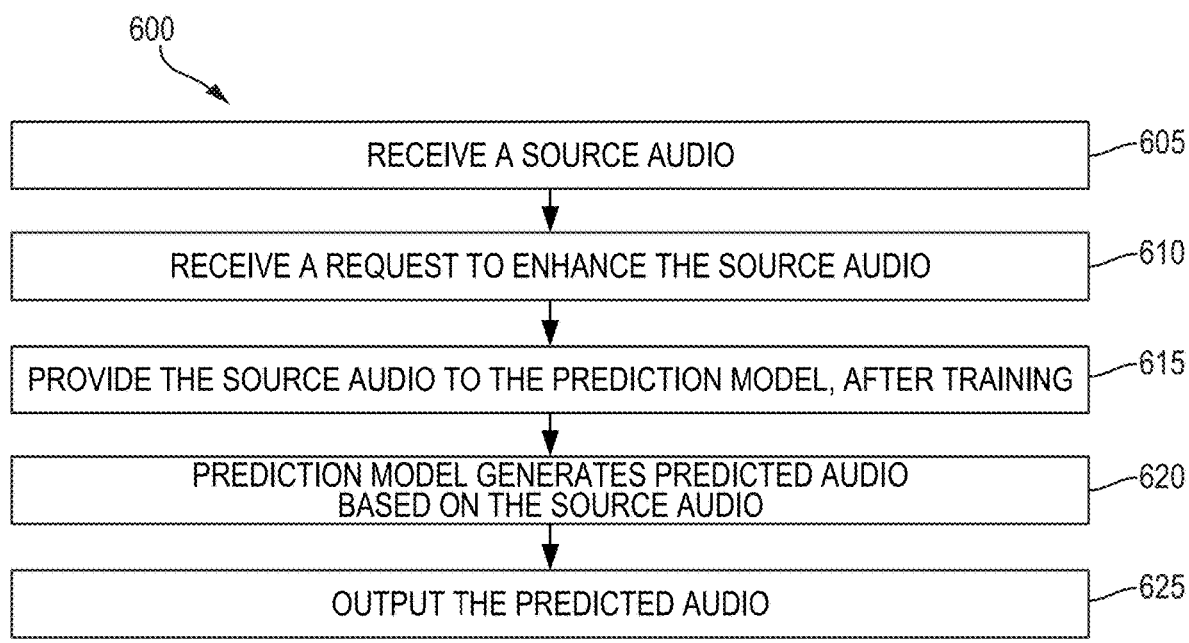
FIG. 6 is a flow diagram of a process of utilizing the prediction model to enhance audio after training, according to certain embodiments described herein.

FIG. 6 is a flow diagram of a process 600 of utilizing the prediction model 230 after training, according to some embodiments. In some embodiments, the prediction subsystem 220 performs part or all of the process 600 described below. Further, the training subsystem 210 performs the process 400 of FIG. 4 prior to the process 600 of FIG. 6 being performed, thus causing the prediction model 230 to have previously been trained as part of the GAN 310 before being placed into operation.

As shown in FIG. 6, at block 605, the process 600 involves receiving a source audio 110. As described above with respect to FIG. 1, in some embodiments, the source audio 110 is received from a user via an interface 100, where that user can be human or automated. For example, that interface 100 enables a user to indicate the source audio 110, thereby enabling the prediction subsystem 220 to access the source audio 110. In one example, the source audio 110 is received as a waveform. However, if the source audio 110 is not stored as a waveform, then an embodiment of the prediction subsystem 220 converts the source audio 110 to a waveform.

At block 610, the process 600 involves receiving a request to enhance the source audio 110. For instance, as described with respect to FIG. 1, an example of the interface 100 includes a button or link enabling the user to request enhancement of the source audio 110. In some embodiments, the request can be made through a single click or selection made by the user, such as by selecting a button labeled "Go," "Enhance," or "Convert" in the interface 100. If the request is received through the interface 100 and the interface 100 is displayed on a first computing device other than a second computing device running the prediction subsystem 220, as shown in FIG. 2, then the first computing device transmits the request to the prediction subsystem 220 at the second computing device, where the request is received and processed.

At block 615, the process 600 includes providing the source audio 110 to the prediction model 230. For instance, responsive to receiving the source audio 110, an embodiments of the prediction subsystem 220 inputs the source audio 110 into the prediction model 230.

At block 620, the process 600 includes generating a predicted audio 130 corresponding to the source audio 110. For instance, based on the source audio 110, the prediction model 230 generates and outputs the predicted audio 130. Given the training described above, the prediction model 230 learned to map a new source audio 110 to an enhanced version (e.g., a studio-quality version) of the new source audio 110. As such, the predicted audio 130 generated at this block 620 is an enhanced version of the source audio 110.

At block 625, the process 600 involves outputting the predicted audio 130 generated at block 620, such as by providing the predicted audio 130 to the user. For instance, if the prediction subsystem 220 runs on a second computing device that differs from a first computing device displaying the interface 100 to the user, then the prediction subsystem 220 causes the second computing device to transmit the predicted audio 130 to the first computing device, which provides the predicted audio 130 to the user. For instance, the first computing device enables the user to download or stream the predicted audio 130 through the interface 100.

Thus, as described above, embodiments described herein provide an end-to-end deep learning solution to enhancing audio, including audio with multiple types of quality issues. Some embodiments fix noise, reverberation, and distortion (e.g., undesirable equalization) to raise a source audio 110 to studio quality sufficient for a professional production.

Figure 7:
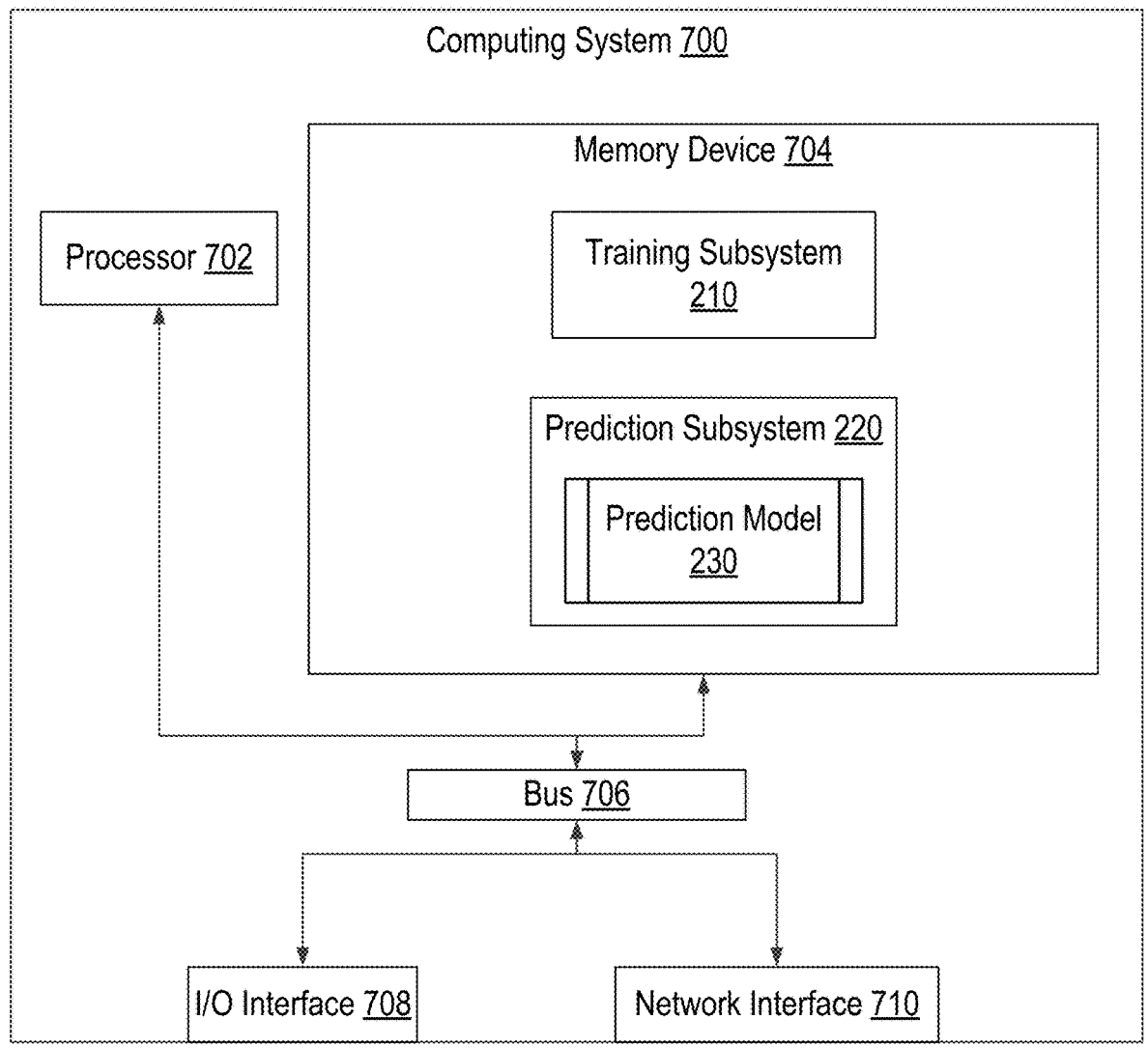
FIG. 7 depicts an example of a computing system that performs certain operations described herein, according to certain embodiments.

Any suitable computing system or group of computing systems can be used for performing the operations described herein. For example, FIG. 7 depicts an example of a computing system 700 that can be used as the prediction server 225, the training server 215, or various other computing devices performing operations described herein. In some embodiments, for instance, the computing system 700 executes all or a portion of the prediction subsystem 220, the training subsystem 210, or both. In other embodiments, a first computing system having devices similar to those depicted in FIG. 7 (e.g., a processor, a memory, etc.) executes the prediction subsystem 220 while another such computing system executes the training subsystem 210, such as in the example of FIG. 1.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as input or output devices. For example, the computing system 700 is shown with one or more input/output ("I/O") interfaces 708. An I/O interface 708 can receive input from input devices or provide output to output devices. One or more buses 706 are also included in the computing system 700. The bus 706 communicatively couples one or more components of a respective one of the computing system 700.

The computing system 700 executes program code that configures the processor 702 to perform one or more of the operations described herein. The program code includes, for example, the prediction subsystem 220, the prediction model 230, the training subsystem 210, or other suitable applications that perform one or more operations described herein. The program code may be resident in the memory device 704 or any suitable computer-readable medium and may be executed by the processor 702 or any other suitable processor. In some embodiments, both the prediction subsystem 220 and the training subsystem 210 are stored in the memory device 704, as depicted in FIG. 7. In additional or alternative embodiments, one or more of the prediction subsystem 220 and the training subsystem 210 are stored in different memory devices of different computing systems. In additional or alternative embodiments, the program code described above is stored in one or more other memory devices accessible via a data network.

The computing system 700 can access the prediction model 230 or other models, datasets, or functions in any suitable manner. In some embodiments, some or all of one or more of these models, datasets, and functions are stored in the memory device 704 of a common computer system 700, as in the example depicted in FIG. 7. In other embodiments, such as those in which the training subsystem 210 is executed on a separate computing system, that separate computing system that executes the training subsystem 210 can provide access to the trained prediction model 230 to enable running of the prediction model 230 by the prediction subsystem 220. In additional or alternative embodiments, one or more programs, models, datasets, and functions described herein are stored in one or more other memory devices accessible via a data network.

The computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and the like. The computing system 700 is able to communicate with one or more other computing devices (e.g., a computing device acting as a client 240) via a data network using the network interface device 710.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
   providing a generative adversarial network (GAN) comprising a prediction model and a discriminator to be jointly trained;
   accessing training data comprising a plurality of tuples, the plurality of tuples comprising source waveforms representing source audios and target waveforms representing target audios, each tuple comprising a source waveform and a corresponding target waveform, wherein the corresponding target waveform is a target version of the source waveform;
   causing the prediction model to generate predicted waveforms based on the source waveforms;
   computing spectrograms of the predicted waveforms output by the prediction model;
   applying a loss function to the predicted waveforms and the target waveforms, the loss function comprising a combination of a spectrogram loss based on variations between the spectrograms of (i) the predicted waveforms and spectrograms of the target waveforms and (ii) an adversarial loss based on output from the discriminator; and
   updating the prediction model to optimize the loss function comprising the combination of the spectrogram loss and the adversarial loss.

2. The method of claim 1, the operations further comprising:
   receiving a request to enhance a new source audio;
   responsive to the request, inputting the new source audio into the prediction model trained to map the source waveforms to the target waveforms; and
   generating, by the prediction model, based on the new source audio, a new predicted audio as an enhanced version of the new source audio.

3. The method of claim 2, wherein the new source audio comprises a quality issue being two or more of noise, reverberation, or distortion, and wherein the prediction model reduces the quality issue in generating the new predicted audio.

4. The method of claim 1, wherein accessing the training data comprises:
   obtaining the target audios; and
   generating the source audios based on the target audios by simulating a plurality of room environments as applied to the target audios.

5. The method of claim 4, wherein simulating the plurality of room environments as applied to the target audios comprises convolving a plurality of room impulse responses with each target audio of the target audios.

6. The method of claim 4, wherein generating the source audios based on the target audios further comprises adding noise to a result of simulating the plurality of room environments as applied to the target audios.

7. The method of claim 4, wherein accessing the training data further comprises:
generating an augmented version of a first target audio, from among the target audios, by at least one of rescaling a volume of the first target audio or modifying a speed of the first target audio,
wherein generating the source audios based on the target audios comprises generating a first source audio based on the augmented version of the first target audio.

8. The method of claim 1, wherein the prediction model comprises a neural network having a feed-forward architecture comprising two or more one-dimensional dilated convolutions with varying dilation rates that increase exponentially to a limit.

9. The method of claim 8, wherein:
the discriminator maps a log mel-spectrogram of a waveform to a score representing a likelihood of authenticity of the waveform, and wherein the discriminator comprises a gated convolutional neural network comprising two or more stacks of convolutional layers, a batch normalization layer, and a gated linear unit.

10. The method of claim 1, wherein the loss function comprises $L_G(x,x') = \alpha|\text{Log Spec}(G(x)) - \text{Log Spec}(x')| + \beta(1 - D(\text{Log Mel}(G(x))))$, where x is a source waveform of the source waveforms, x' is a target waveform corresponding to the source waveform, $\alpha$ and $\beta$ are weighting factors, $G(x)$ is a predicted waveform generated by the prediction model based on the source waveforms, $D( )$ is output from the discriminator, Log Spec( ) is a log spectrogram, and Log Mel( ) is a log mel-spectrogram.

11. A system for enhancing audio, the system comprising:
a training subsystem configured to train a prediction model to enhance source audios, the training subsystem configured to:
access training data comprising a plurality of tuples, the plurality of tuples comprising source waveforms representing source audios and target waveforms representing target audios, each tuple comprising a source waveform and a corresponding target waveform, wherein the corresponding target waveform is a target version of the source waveform;
cause the prediction model to generate predicted waveforms based on the source waveforms;
compute spectrograms of the predicted waveforms output by the prediction model;
apply a loss function to the predicted waveforms and the target waveforms, the loss function comprising a combination of (i) a spectrogram loss based on variations between the spectrograms of the predicted waveforms and spectrograms of the target waveforms and (ii) an adversarial loss based on feedback from a discriminator of a generative adversarial network (GAN); and
update the prediction model to optimize the loss function comprising the combination of the spectrogram loss and the adversarial loss.

12. The system of claim 11, wherein:
the prediction model inputs the source waveforms and outputs the predicted waveforms; and
the discriminator inputs predicted spectrograms of the predicted waveforms and outputs scores indicating likelihood of authenticity of the predicted waveforms.

13. The system of claim 11, further comprising a prediction subsystem comprising:
an interface configured to receive a new source audio; and
a prediction model configured to map the new source audio to a new predicted audio, wherein the new predicted audio is an enhanced version of the new source audio.

14. The system of claim 13, wherein the training subsystem is further configured to generate the source audios, and wherein generating the source audios comprises:
obtaining the target audios; and
generating the source audios based on the target audios by convolving a plurality of room impulse responses with each target audio of the target audios.

15. The system of claim 14, wherein generating the source audios based on the target audios further comprises adding noise to a result of simulating a plurality of room environments as applied to the target audios.

16. The system of claim 14, wherein the training subsystem is further configured to:
generate an augmented version of a first target audio, from among the target audios, by at least one of rescaling a volume of the first target audio or modifying a speed of the first target audio,
wherein generating the source audios based on the target audios comprises generating a first source audio based on the augmented version of the first target audio.

17. The system of claim 11, wherein the prediction model comprises a neural network having a feed-forward architecture comprising two or more one-dimensional dilated convolutions with varying dilation rates that increase exponentially to a limit.

18. The system of claim 17, wherein the discriminator maps a log mel-spectrogram of a waveform to a score representing a likelihood of authenticity of the waveform, and wherein the discriminator comprises a gated convolutional neural network comprising two or more stacks of convolutional layers, a batch normalization layer, and a gated linear unit.

19. A non-transitory computer-readable medium embodying program code for enhancing audio, the program code comprising instructions that, when executed by a processor, cause the processor to perform operations comprising:
providing a generative adversarial network (GAN) comprising a prediction model and a discriminator to be jointly trained;
obtaining training data comprising a plurality of tuples, the plurality of tuples comprising source waveforms representing source audios and target waveforms representing target audios, each tuple comprising a source waveform and a corresponding target waveform, wherein the corresponding target waveform is a target version of the source waveform;
training the GAN based on the training data, wherein the training comprises:
causing the prediction model to generate predicted waveforms based on the source waveforms;
computing spectrograms of the predicted waveforms output by the prediction model;
applying a generator loss function to the predicted waveforms and the target waveforms, the generator loss function comprising a combination of a spectrogram loss based on variations between the spectrograms of the predicted waveforms and spectrograms of the target waveforms and (ii) an adversarial loss based on output from the discriminator; and updating the prediction model to optimize the generator loss function comprising the combination of the spectrogram loss and the adversarial loss;

wherein, after the training, the prediction model is configured to generate new predicted audios based on new source audios.

20. The non-transitory computer-readable medium of claim 19, wherein:

the prediction model comprises a neural network having a feed-forward architecture comprising two or more one-dimensional dilated convolutions with varying dilation rates that increase exponentially to a limit;

the generator loss function comprises $L_G(x,x')=\alpha|\text{Log Spec}(G(x))-\text{Log Spec}(x')|+\beta(1-D(\text{Log Mel}(G(x))))$, where x is a source waveform of the source waveforms, x' is a target waveform corresponding to the source waveform, $\alpha$ and $\beta$ are weighting factors, $G(x)$ is a predicted waveform generated by the prediction model based on the source audio waveforms, $D(\ )$ is output from the discriminator, Log Spec( ) is a log spectrogram, and Log Mel( ) is a log mel-spectrogram; and the discriminator maps a log mel-spectrogram of a waveform to a score representing a likelihood of authenticity of the waveform, wherein the discriminator comprises a gated convolutional neural network comprising two or more stacks of convolutional layers, a batch normalization layer, and a gated linear unit.

* * * * *